July 30, 1935.    G. BLATCHFORD    2,009,758
DOG HOUSE
Filed Feb. 14, 1934
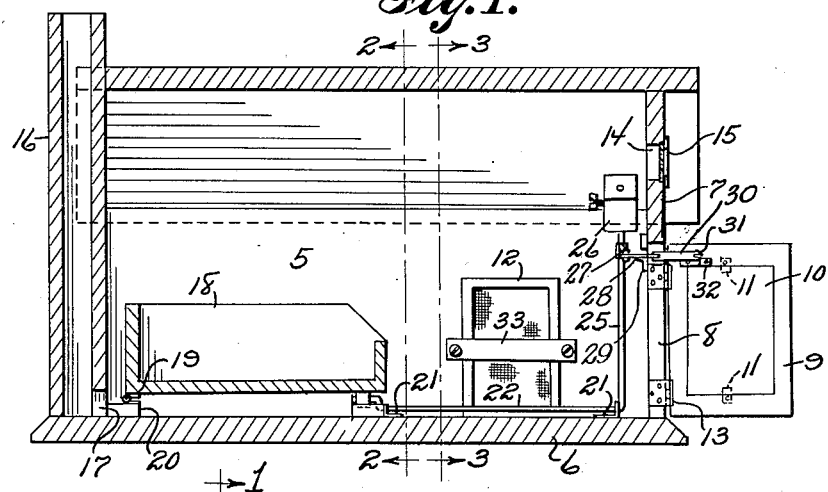
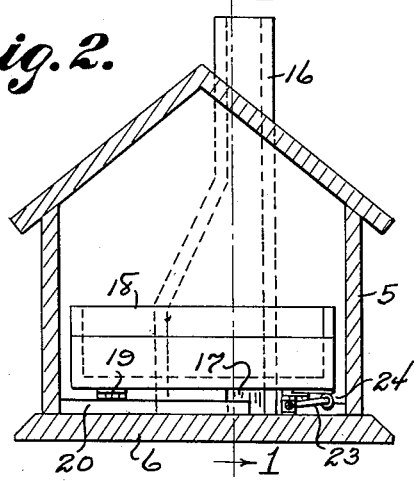
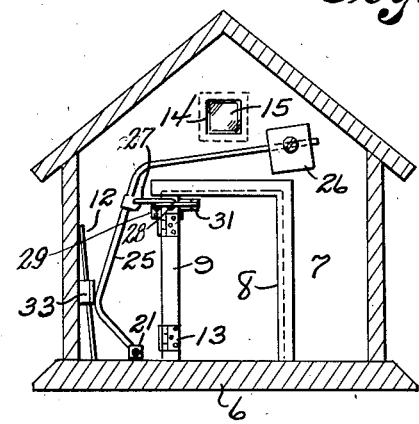
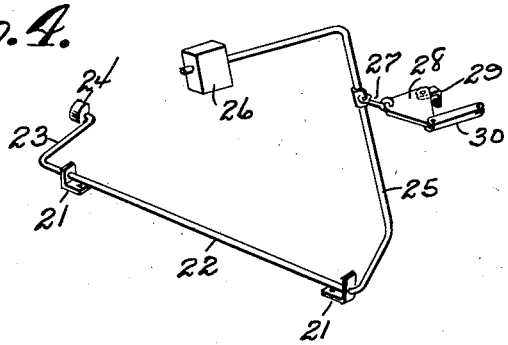
George Blatchford INVENTOR
BY Victor J. Evans & Co.
ATTORNEY Patented July 30, 1935

2,009,758

UNITED STATES PATENT OFFICE 2,009,758

DOG HOUSE

George Blatchford, Friend, Nebr.

Application February 14, 1934, Serial No. 711,248

1 Claim. (Cl. 119—19)

The invention relates to a dog house or cabinet and more particularly to a structure of this kind having a self-closing door and a ventilating system.

The primary object of the invention is the provision of a structure of this character, wherein the entrance door is controlled so that when the animal is without, such door will remain open and on the entrance of the animal to the house or cabinet and by occupancy of a bed or bunk the door to the said house or cabinet will automatically close, the mechanism for actuating the door in the opening and closing thereof automatically being of novel construction.

Another object of the invention is the provision of a structure of this character, wherein ventilation is assured when the door is closed and such ventilation being effected in a novel manner, the house or cabinet in its entirety being of novel form.

A further object of the invention is the provision of a structure of this character which is extremely simple in its make-up, thoroughly reliable and efficient in its purpose, readily portable, durable, automatically operable for the control of the door, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a vertical longitudinal sectional view through a house or cabinet constructed in accordance with the invention, the entrance door being in open position and the bed or bunk unoccupied.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a perspective view of the control mechanism for the automatic working of the entrance door to the house or cabinet.

Similar reference characters indicate corresponding parts throughout the several views in the drawing.

Referring to the drawing in detail, the house or cabinet comprises a body 5 having the base 6 constituting the floor and formed in the vertical front wall 7 of this body is the doorway 8 for a horizontally swinging entrance door 9 carrying a removable solid panel 10, the same being held in place by releasable clips 11, so that in substitute for the panel 10 the wire mesh screen panel 12 can be placed in the door for ventilating purposes. The door is swung upon hinges 13 of conventional kind.

In this front wall 7 above the door frame 8 is an opening 14 having the window 15 of any approved kind.

Provided at the rear wall of the body 5 is a chimney 16 having the opening 17 and this chimney permits ventilation to the interior of the house or cabinet.

Arranged interiorly of the body 5 is a bed or bunk 18 which at its rear end is connected by a hinge 19 to a bearing 20, so that said bed or bunk 18 is permitted vertical swinging movement and is elevated with relation to the floor of the base 6, the elevation being for permitting air circulation beneath said bed or bunk. Arranged longitudinally within the body 5 and supported in suitable bearings 21 secured to the floor or base 6 for rocking movement is an actuator shaft 22 having the crank 23 carrying a roller 24 at its free end and this roller being disposed beneath the free end of the bed or bunk 18, so that on occupancy of the latter the weight thereof will act upon the crank 23 for the rocking of the shaft 22 in one direction. The shaft 22, opposite the crank 23, is formed with a throw arm 25 supporting an adjustable weight 26 and connected by a link 27 with a shift member 28 pivoted to a hanger or bracket 29 carried at the inner side of the front wall 7 of the body 5. This member 28 also has pivotally connected thereto the link 30 which is also pivoted, at 31, to a bracket 32 upon the door 9, so that when the arm 25 is shifted or thrown under the weight of the occupant of the bed or bunk 18 the door 9 will be moved to closed position. Then when the bed or bunk 18 is unoccupied the weight 26 on the arm 25 will cause the said arm 25 to reversely swing for the opening of the door 9.

It should be apparent that when the bed or bunk 18 within the house or cabinet is unoccupied, the door 9 is in open position and when the dog or other animal enters from without the said housing or cabinet and occupies the bed or bunk 18, the weight of this occupant, through the shaft 22, arm 25 and its connection with the door 9, will automatically close the latter and such door will be maintained closed until the bed or bunk 18 becomes unoccupied.

The weight 26 on the arm 25 is adjustable to vary the action of the door 9, as should be obvious.

The screen panel 12 when not carried by the door 9 is held within a rack 33 within the body 5, convenient for reach.

The interior of the body 5 is susceptible of thorough ventilation by reason of the disposition of the bed or bunk 18 and the arrangement of the chimney 16 with the opening 17 and such ventilation will be increased when the wire mesh screen 12 replaces the solid panel 10 in the door 9.

What is claimed is:

A dog house comprising a body forming an enclosure having an opening in one wall, a horizontally swinging door closing said opening, a bearing at the bottom of said body remote from the door, a bunk having one end hinged to said bearing for vertical movement, a shaft journaled longitudinally of the body at one side of the opening, a crank formed at the innermost end of said shaft and disposed beneath the free end of the bunk, a crank at the other end of the shaft and extended reversely to the first-mentioned crank and upwardly and over the opening in the body, an adjustable weight on the last-mentioned crank, a rocking member for horizontal movement pivotally supported on the wall having the opening and elevated from the bottom of the body, a link connecting said rocking member with the last-mentioned crank, and a link pivotally connecting said rocking member with the door.

GEORGE BLATCHFORD.